US005849253A

United States Patent [19]

Crossdale et al.

[11] Patent Number: 5,849,253

[45] Date of Patent: Dec. 15, 1998

[54] DISPENSER

[75] Inventors: Garry W. Crossdale, Ripley; Peter J. Bacon, Ashby de la Zouch; Michael Veveris, Sinfin, all of Great Britain

[73] Assignee: Diversey Lever, Inc., Plymouth, Mich.

[21] Appl. No.: 947,550

[22] PCT Filed: Dec. 14, 1993

[86] PCT No.: PCT/CA93/00538

§ 371 Date: Sep. 5, 1995

§ 102(e) Date: Sep. 5, 1995

[87] PCT Pub. No.: WO94/13187

PCT Pub. Date: Jun. 23, 1994

Related U.S. Application Data

[63] Continuation of Ser. No. 464,889, filed as PCT/CA93/00538, Dec. 14, 1993, published as WO94/13187, Jun. 23, 1994, abandoned.

[30] Foreign Application Priority Data

Dec. 14, 1992 [GB] United Kingdom .................. 9226067

[51] Int. Cl.[6] ............................ A47L 15/44; D06F 39/02; B01D 11/02

[52] U.S. Cl. .......................... 422/264; 422/261; 422/263; 422/266; 134/6; 134/7; 134/93; 134/198; 222/181; 222/185; 222/153.08; 383/52; 383/55; 383/206

[58] Field of Search ............................ 422/261, 263–264, 422/266–267, 276–278; 383/206–208, 52, 55; 222/181, 185, 153.08; 252/93; 134/6, 7, 93, 198; 208/22

[56] References Cited

U.S. PATENT DOCUMENTS

| | | | |
|---|---|---|---|
| 1,993,923 | 3/1935 | Eccardt | 422/266 |
| 2,072,976 | 3/1937 | Andrus | 422/266 |
| 2,527,074 | 10/1950 | Port | 383/206 |
| 3,301,687 | 1/1967 | Davy | 383/206 |
| 5,147,615 | 9/1992 | Bird et al. | 422/261 |

FOREIGN PATENT DOCUMENTS

| | | |
|---|---|---|
| 0314890 | 10/1989 | European Pat. Off. . |
| 2561229 | 9/1985 | France . |
| WO 9109561 | 7/1991 | Germany . |

*Primary Examiner*—Hien Tran
*Attorney, Agent, or Firm*—A. Kate Huffman

[57] ABSTRACT

A dispenser for powdered, granular, pellet, briquette or tablet-like material is provided. The dispenser includes a dispenser head through which the material dissolved in water can be dispensed. A spray device is provided at the head to spray water onto the material provided in the dispenser head. A suspension device is provided to suspend a bag containing the material above the dispenser head. The bag in its suspended orientation has a fastener along the bottom end which closes the bottom end of the bag. The fastener is not, however, releasable until after the bag is mounted in the dispenser. Then the fastener is releasable to allow the contents thereof to fall by gravity onto the dispenser head. The dispenser provides a system, which normally avoids contact of the toxic contents of the bag with the user. At the same time, the only waste is in the form of a bag which may be made of recyclable plastic, hence minimizing waste associated with the system.

24 Claims, 3 Drawing Sheets

DISPENSER

This application is a file wrapper continuation of application Ser. No. 08/464,889 filed as PCT/CA93/00538 Dec. 14, 1993 published as WO94/13187 Jun. 23, 1994, now abandoned.

FIELD OF THE INVENTION

The invention relates to a dispenser for powder, tablet, briquette, granular, or pelletized material, for example caustic dishwashing granules which are dissolved in water and dispensed into a dishwashing machine.

BACKGROUND OF THE INVENTION

A dispenser for this purpose is described in the applicant's European Patent 0300819 and its corresponding U.S. Pat. No. 5,147,615. In this dispenser, an inverted rigid container of granular, pellet or powder material is mounted on a dispenser head which includes spray means to inject a spray of water preferably in a generally horizontal direction. The spray dissolves the granular material falling out of the container and washes it into the washing machine.

A disadvantage of this system is that the containers are relatively expensive and so involve a waste of resources if they are not reused. Furthermore, the empty containers are bulky and inconvenient to handle.

In a system sold by the company Henkel in Germany, it is known to place a bag of the powder or granular chemical material in a hopper above a dispenser. The dispenser includes a wire which is moved to cut open the bag. The bag is then shaken to fill the hopper and empty the bag, which is then removed.

A disadvantage of this system is that in shaking and removing the bag, the powder or granular material tends to get split. This can be a health hazard to the user by inhalation or contact with the powder and, as well, as an inconvenience.

Other types of containerized dispensers for detergents and other forms of powdered or granular chemicals are described in U.S. Pat. Nos. 3,416,897 and 5,078,301. In U.S. Pat. No. 3,416,897, the chemicals to be dispensed are housed in a charge unit cartridge which has a rigid top and bottom and sidewalls of fabric mesh. The fabric mesh allows liquids to contact the chemicals within the cartridge, dissolve same and form a concentrated solution thereof for dispensing. The charge unit cartridge is supported within a dispensing device by the rigid top being supported on a shelf projection or like in the dispenser, and the rigid bottom of the charge unit cartridge rests on a suitable pedestal. The dispenser unit is filled with water to at least the level of the overflow dispensing pipe where the water within the dispenser dissolves. The chemicals from the charge unit by the water freely moving through the mesh sides of the cartridge. When dispensing of the chemicals is complete, the cartridge may be removed and replaced. However as with the bag system provided by Henkel, as noted hereinabove, the meshed sidewalls of the cartridge can expose the operator to the chemicals particularly in the dry condition when installing the cartridge within the dispenser.

U.S. Pat. No. 5,078,301 discloses a dispenser system which uses water soluble film to contain the powders. The water soluble film may be made from polyvinyl alcohol, polyvinyl acetate, methyl cellulose, hydroxyethyl cellulose, carboxymethyl cellulose, sodium carboxymethyl hydroxyethyl cellose, polyvinylpyrrolidone, poly(alkyl)oxozolene and film forming derivatives of polyethylene glycol. The water soluble film, which contains the powder to be dispensed, may be shipped in a tougher water impervious bag or the like which is removed before the dispenser bag is placed in the dispensing unit. When water is introduced to the dispensing unit, the water soluble film dissolves, releasing the powder to the water spray to provide a concentrated solution of the composition contained in the bag for cleaning or sanitizing use. The bag is simply dropped to within the dispenser and, by virtue of the water solubility of the film, the dispenser then primarily contains the powdered detergent. However, the undissolved residue of such bag tends to clog the dispenser. Furthermore, the requirement of an outer or exterior over-wrap adds to additional manufacturing costs and possible end use problems because the operator may forget to remove the over-wrap before placing the bag in the dispenser.

An object of the invention is to provide an improved dispenser.

SUMMARY OF THE INVENTION

According to an aspect of the invention, a dispenser for powdered, granular, pellet, briquette or tablet-like material comprises a dispenser head through which the material dissolved in water can be dispensed. A spray means is provided at the head to spray water onto the provided material in the dispenser head. Suspension means suspends a bag containing the material above the dispenser head. The bag in its suspended orientation has means along a bottom end of the bag for closing the bottom end. The bag has at the bottom end, means for opening the closing means after the bag is suspended from the suspension means, thereby allowing the material to empty out of the bag and into the dispenser head as the material is dispensed.

Preferably, the bag is closed by a water soluble fastening which is released upon wetting by the spray. Alternatively, the bag has a seal which is broken manually by the user after it is hung above the dispenser head. This can be done by pulling a thread which closes the bottom of the bag by stitching.

An advantage, according to an aspect of the invention, is that all that remains to be disposed of is an empty bag, which is relatively cheap and easily compressed.

BRIEF DESCRIPTION OF THE DRAWINGS

Preferred embodiments of the invention are described in detail below, by example only, with reference to the accompanying drawings, wherein.

DETAILED DESCRIPTION OF THE PREFERRED EMBODIMENTS

The dispenser, according to this invention, is capable of dispensing several different types of solid materials for a variety of uses. The solid material to be dispensed may be a detergent, fabric softener, laundry composition, ware washing composition, pot and pan presoak composition, silverware presoak composition, floor cleaner composition, rinse additive composition, a disinfectant composition, sanitizer composition, a general purpose cleaner, pool treatment chemicals, other forms of water treatment chemicals and the like. The solid compositions are free-flowing so that they may be dispensed from the bag. The free-flowing solids may be in the form of powders, granular materials, or granulated material in the form of tablets, briquettes, pellets and other solid shapes. The powders and granular forms of material may be formed in the usual manner, such as involving spray drying. The tablets may be formed by any one of standard tableting machines, such as the Stokes brand tableter. The pellets may be formed by any conventional methods and more particularly, may be formed in accordance with applicant's process described in U. S. Pat. No. 4,931,202. Further examples of compositions which may be used in making the solid detergent compositions are described in applicant's issued U.S. Pat. No. 4,957,755.

Figure 1:
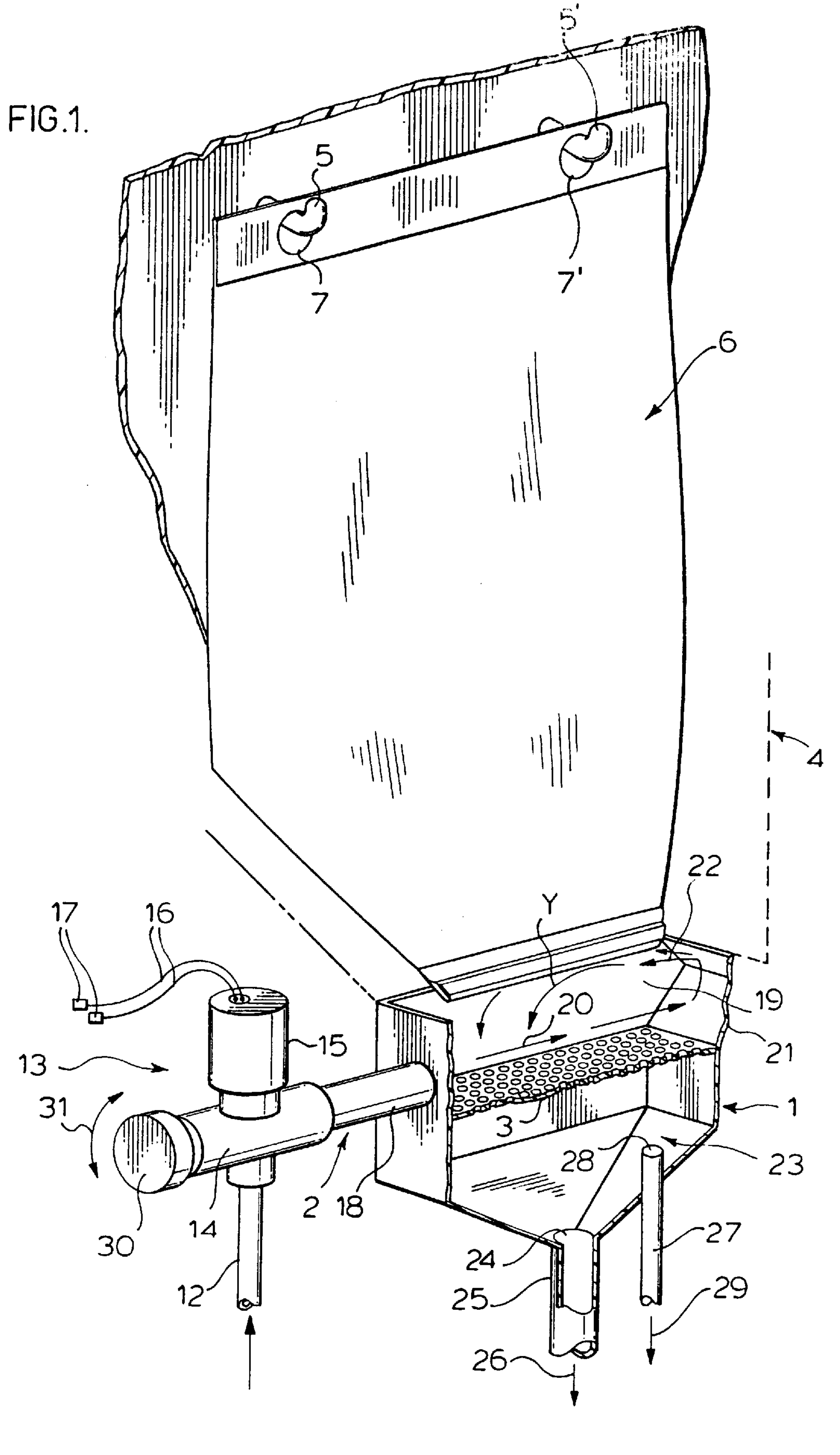
FIG. 1 is a perspective view of the dispenser according to an aspect of the invention with a portion thereof broken away to show details of the bag suspension system.
Figure 2:
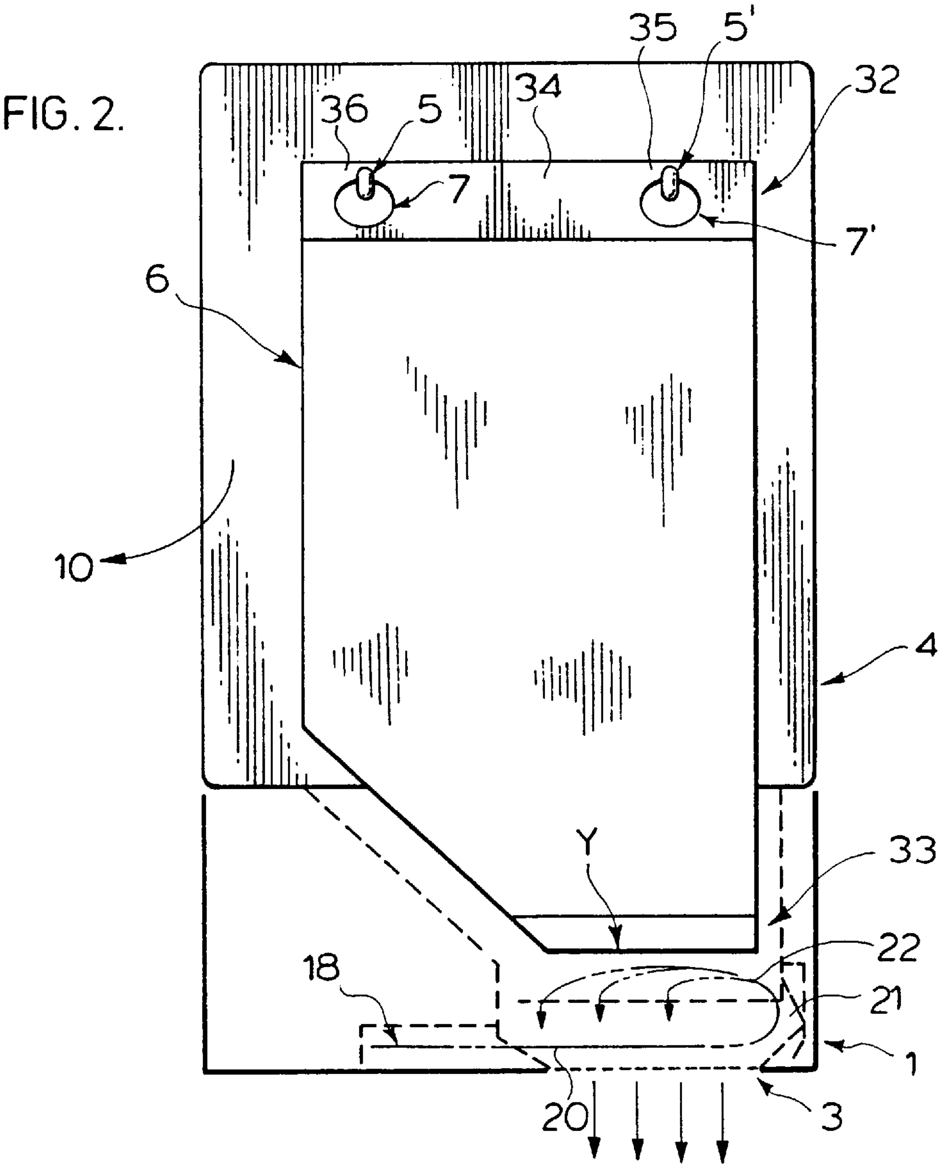
FIG. 2 is a schematic elevational view of a dispenser according to the invention.

The dispenser of FIGS. 1 and 2 comprises a dispenser head 1 and a spray means 2 for spraying water onto the granular, tableted, pelletized briquetted, or powder material which falls into the dispenser head. When the bag opens, it is the objective of the invention that the product flows into a reservoir area in the dispenser head, and that the majority of the products stays in the bag until product in the reservoir is dissolved and then further product falls until the bag is empty and is replaced.

The dispenser head 1 and spray means 2 can be as described in the aforementioned European Patent 300,819 and its corresponding U.S. Pat. No. 5,147,615 and so are not described in detail here. The cap of the bottle described in this United States patent forms, in the present dispenser, a part of the dispenser head 1. The water is sprayed into the head 1, in accordance with an embodiment of this invention, in a generally horizontal direction to dissolve and wash the material downwards through a mesh 3.

The pressurized water supply for the spray device 2 is provided in conduit 12 to the control system for the spray device. The control system 13 comprises a solenoid controlled valve 14 with solenoid 15 connected to a suitable controller through electrical wires 16 having plug contacts 17. A suitable control signal is provided by a wire 16 to solenoid 15 to either open or close the valve 14. When it is desired to dispense detergent, the signal is sent to the solenoid 15 to open the valve 14 and thereby release water under pressure from conduit 12 through the water injector 18 and into the dispenser head mixing chamber 19. The water is injected from the injector 18 in a horizontal direction of arrows 20. The horizontally directed water, if there is no obstruction on top of the mesh 3, impacts the deflector 21 which reverses the direction of the water back in the direction of arrows 22 and generally downwardly in the direction of arrows Y. The material, as dissolved, is washed through the mesh 3 and flows into a funnel-shaped outlet 23. At the base of the outlet is an opening 24 in communication with dispensing pipe 25 which directs the detergent in the direction of arrow 26 which leads to a washing machine, chemical dispenser or the like. Also in outlet 23 is an overflow tube 27 which has its open upper end 28 above the outlet 24. The purpose of the overflow is described in U.S. Pat. No. 5,147,615. The purpose of the overflow is to provide a secondary outlet for the dissolved detergent in the event that outlet 24 becomes clogged. The overflow 27 leads in the direction of arrow 29 to the same device as conduit 25.

The pressure in conduit 12 may be varied by turning pressure control knob 30 in either direction of arrow 31. Turning the knob 30 in a first direction increases the pressure of the water that flows through the injector 18 when the solenoid 15 opens the valve 14. Conversely rotation of the knob in the opposite direction decreases the water pressure. It may be desirable to vary the water pressure depending upon the type of material to be dispensed. In dispensing powdered material, which may become hardened or clogged on top of the mesh 3, a high water pressure is desired; whereas with tablets or pellets, a lower water pressure may be desired because of the voids developed in the tablets and pellets piled on top of the mesh 3. Also, the velocity of the water stream impacting on the materials can also affect the dissolution rate, so that concentration of materials dispensed may also be varied by varying the water pressure through movement of knob 30. It is understood that the system operates essentially in the same manner as an embodiment described in the aforementioned United States patent. By injection of water, when dispensing of the material is required, the material continues to fall from the bag 6 to rest on top of the mesh 3. The water dissolves or breaks-up the material to the extent that it can pass through the mesh 3, such action being generally referred to as dissolution of the material such that the material flows with the water through conduit 25. Not all of the material may be dissolved in the solution. Some of the material may be carried to the use apparatus as small particles which continue to dissolve in the use apparatus.

Above the dispenser head 1 is mounted a hopper 4 with a hinged front as indicated by arrow 10. Towards the top of the hopper 4 are fitted a pair of pegs 5,5' from which hangs a bag 6. Slots 7,7' in the bag are slotted onto the pegs 5,5'. The slots 7,7' are spaced apart so as to be in register with the spaced-apart pegs 5,5'. The upper end 32 of the bag 6 may have a reinforced portion 34 which provides sections 35 and 36 above the slots 7 and 7' which are capable of carrying the weight of the contents in the bag 6 at least until dispensing of the material has commenced, at which time the bottom end 33 of the bag is opened to release material onto the mesh 3.

It is appreciated that a variety of devices may be used for suspending the bag above the dispensing head 1. The suspension system may not involve a hopper 4. Instead a funnel-like component may be provided above the dispensing head 1 where the bag is suspended in open space by a standard or the like extending up from the dispensing head. The standard can carry the pegs 5 or some other mechanism for suspending the bag where the lower part of the bag is surrounded by the funnel-like component. Furthermore, the type of mechanism for suspending the bag may be other than the embodiment described with respect to the use of the pegs and slots. However, it is understood that other suspension systems are available which may be provided on an outboard standard or part of the hopper 4. Such systems may include a spring-loaded clip or the like which grasps the upper portion 32 of the bag. Alternatively, the upper portion 32 of the bag may have formed therein a wedge-shaped portion which is slid into a correspondingly wedge-shaped device which has the undercut portions to support the bag 6 when the wedge of the bag is mounted in the slide.

Figure 3:
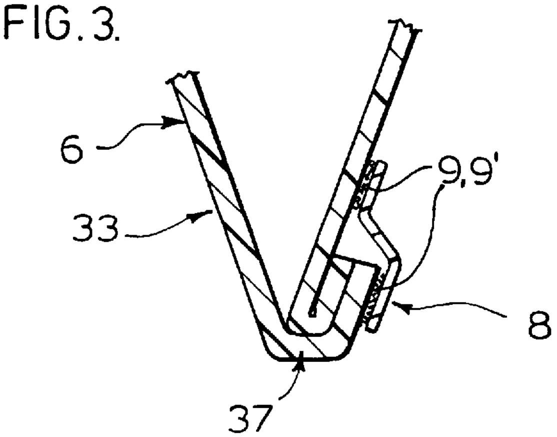
FIG. 3 is a schematic sectional view of a detail of the bag closure of FIG. 2.

The bag 6 contains the materials to be dispensed and sized so that its bottom end in the suspended orientation for the bag is opposite to the end 32 with the apertures 7,7'. The bottom end is suspended just above the dispenser head 1. This bottom end 33 is closed by means of a water soluble tape 8, fixed over a fold in the bag by an adhesive 9,9', as shown in FIG. 3. The fold keeps the contents away from the tape to prevent degradation of the tape and also gives a substantially air-tight seal.

In this embodiment, the closing means is constituted by the fold generally designated 37 in the lower bag end 33. Before use, the fold is held in place by the water soluble device 8. In this embodiment, the opening means for the closing means 37 is the water soluble component 8. As a result, the closing and opening means cooperate in a manner that, when the bag is prepared for shipping and awaiting use, the bottom end 33 is closed off, whereas after the bag is suspended in the dispenser, the opening means 8 is actuated in essence remotely to cause an opening of the closing means to release the material downwardly by gravity onto the mesh 3. In this manner, the operator never has to come in contact with the material contained within the bag 6. This significantly improves the safety of the system and as well provides considerable convenience for change-over for the operator. It is understood that the water soluble component 8 may be tape made from water soluble polymers such as the aforementioned polyvinyl alcohols. The water soluble component may also be water soluble paper of the U.S. Pat. No. 5,147,615.

To operate the dispenser, the hopper is opened and a full bag is suspended therein by hanging the bag on the pegs. The upward spray of water dissolves the water soluble tape 8, thus opening the bag and allowing the material to fall onto the mesh 3 of the dispenser head 1. The material is dissolved and washed into the dishwasher by the horizontal jet 20 and downwardly falling stream Y of water.

After all the contents have been dissolved and washed away, all that is left in the dispenser for disposal is an empty, light-weight, collapsible bag. The bag may be made of polyethylene, for example however, other suitable polymeric materials may be used as long as the chosen polymer is inert to the contents. It is also appreciated that other bag materials may be used, such as wax coated paper or plastic coated paper. Such coatings on the paper prevent degradation of the paper structure by the water sprays.

Figure 4:
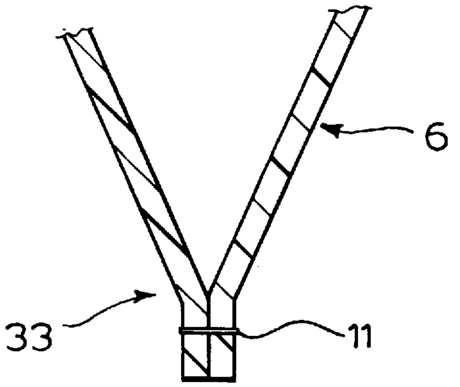
FIG. 4 is a schematic sectional view of an alternative embodiment for the bag closure.
Figure 5:
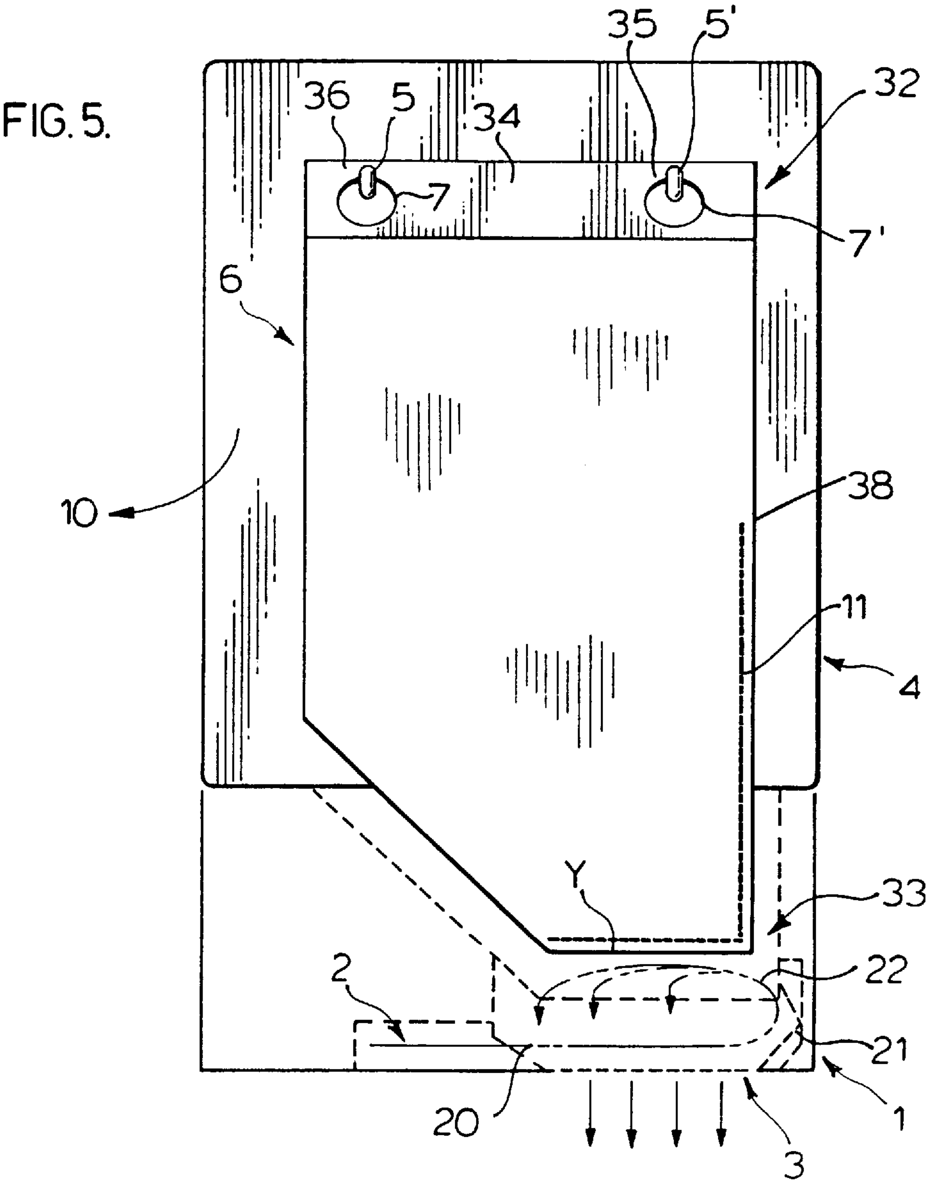
FIG. 5 is a schematic elevational view of another dispenser according to the invention which suspends the bag closure.

The second embodiment of the invention, shown in FIGS. 4 and 5, differs from the first in the mechanism by which the suspended bag is opened. All other aspects of the bag and the suspension system may be the same as shown in FIG. 2. The lower end or bottom end 33 of the bag is closed by means of chain-lock seam stitches—see the row of stitching in FIG. 5. At an end of the stitching 11, a thread 38 of the stitching, extends out through a slot (not shown) in the side of the hopper after the bag is suspended therein. To open the bag, the cord or thread 38 is pulled and this releases the stitching down the side of the bag and then along the end of the bag. The end of the bag thus opens to allow the contents to fall into the dispenser head and be dissolved and washed away as before. The stitching down the side is there merely to maintain the end of the cord in an accessible position for pulling. Even though the stitching may be removed from the side of the bag by pulling the thread 38, the side of the bag does not open, because it is sealed permanently along its side.

Other methods of opening the bag could be used. The important feature is that the bag need only be removed from the dispenser when it is empty. This procedure avoids user contact with the chemicals which could not be accomplished with prior bag type units. For example, various combinations of closure devices may be used. It may be desirable to protect the water soluble fastening. This can be done by having a second ply of material connected to the bag and enclosing the bottom end of the bag. The second ply of material therefore serves to seal the water soluble fastening from outside conditions to avoid premature release of the fastener should it be exposed to water. In this situation, the second ply of material may be slit or otherwise opened to expose the water soluble fastener before the bag is placed in the dispensing device. Another alternative is to provide a combination of the water soluble fastening device and the chain-lock stitching. The bottom end, as shown in FIG. 3 for the bag, may have the folded over portion 37 stitched together with the chain-lock stitching of the type shown in FIG. 4. Such chain-lock stitching provides additional security for the water soluble fastening device. In use, the bag may be suspended over the dispensing head and then the chain-lock stitching removed, such as described with respect to the FIG. 5, by pulling on the stitching thread 38. The material, however, does not yet fall out of the bag until water is injected into the system to dissolve the water soluble fastener 8. This then allows the bag to unfold due to the weight of the contents, thereby allowing the material to fall onto the mesh 3 for purposes of dispensing.

The bags can be of any chosen shape, depending on the form of the hopper above the dispenser head. The loose material in the bag could be in other solid forms equivalent to powders or granules, for example as already mentioned, pellet, tablet or briquette form.

It should be noted that the invention is not limited to a dispenser with the preferred horizontal water jet. Conventional dispensers with vertical jets could be adapted for use with the dispenser of this invention.

Although preferred embodiments of the invention are described herein in detail, it will be understood by those skilled in the art that variations may be made thereto without departing from the spirit of the invention or the scope of the appended claims.

We claim:

1. A combination comprising a dispenser and a flexible bag containing a water-soluble solid material said dispenser having a dispenser head through which said material dissolved in water can be dispensed, a spray means being provided at the head and constructed to spray water onto the solid material after the solid material has been falling out of the bag and into said dispenser head and suspension means holding said bag containing the material above the dispenser head in a suspended orientation, said bag comprising first and second sheets, said first and second sheets having bottom edges forming an opening, said bag in its suspended orientation having means along a bottom end of said bag for closing said opening, said bag having at said bottom end means for opening said closing means after said bag is suspended from said suspension means, thereby allowing the solid material to empty out of said bag and into said dispenser head.

2. The combination according to claim 1, wherein said closing means is a water soluble fastening means, said opening means being a water soluble portion of said fastening means, said fastening means being released upon wetting of said opening means by water spray to open thereby said fastening means.

3. The combination according to claim 1, wherein said closing means is a seal, said opening means being manually actuated by a user after said bag is suspended above the dispenser head.

4. The combination according to claim 3, wherein said seal comprises chain-lock stitching for closing said bottom end of the bag, said opening means comprising a thread as part of said stitching which is pullable to release the stitching and open the bottom end of the bag.

5. The combination according to claim 2, wherein said closing means is a combination of said water soluble fastening means and a manually operable seal, said seal being manually opened before said bag is suspended in said dispenser, opening of said seal exposing said water soluble fastening means, said water soluble fastening means being opened by water spray.

6. The combination according to claim 2, wherein said closing means is a combination of said water soluble fastening means and said chain-lock stitching, said chain-lock stitching being released before water spray is sprayed into said dispensing head.

7. The combination according to claim 1, wherein said dispenser has a plurality of walls and wherein said suspension means comprises first and second suspension components, said first component being attached to one of said walls of said dispenser and located above said dispenser head and said second component being provided on said bag, said second component interacting with said first component to suspend said bag with said bag bottom end adjacent to said dispenser head.

8. The combination according to claim 7, wherein said first suspension component is a pair of pegs attached to one of said walls of said dispenser in a spaced-apart manner, said second suspension component being a pair of slots in an upper portion of said bag, said pair of slots being spaced apart to register with said spaced-apart pegs, said bag being suspended by inserting said pegs through said slots.

9. The combination according to claim 1 further comprising a hopper provided above said dispenser head and in which said bag is suspended.

10. The combination according to claim 4, wherein said closing means is a combination of a water soluble fastening means and said chain-lock stitching, said chain-lock stitching being released before water spray is sprayed into said dispensing head.

11. The combination according to claim 2, wherein said suspension means comprises first and second suspension components, said first component being attached to said dispenser and located above said dispenser head and said second component being provided on said bag, said second component interacting with said first component to suspend said bag with said bag bottom end adjacent to said dispenser head.

12. The combination according to claim 3, wherein said suspension means comprises first and second suspension components, said first component being attached to said dispenser and located above said dispenser head and said second component being provided on said bag, said second component interacting with said first component to suspend said bag with said bag bottom end adjacent to said dispenser head.

13. The combination according to claim 4, wherein said suspension means comprises first and second suspension components, said first component being attached to said dispenser and located above said dispenser head and said second component being provided on said bag, said second component interacting with said first component to suspend said bag with said bag bottom end adjacent to said dispenser head.

14. The combination according to claim 5, wherein said suspension means comprises first and second suspension components, said first component being attached to said dispenser and located above said dispenser head and said second component being provided on said bag, said second component interacting with said first component to suspend said bag with said bag bottom end adjacent to said dispenser head.

15. The combination according to claim 6, wherein said suspension means comprises first and second suspension components, said first component being attached to said dispenser and located above said dispenser head and said second component being provided on said bag, said second component interacting with said first component to suspend said bag with said bag bottom end adjacent to said dispenser head.

16. The combination according to claim 11, wherein said first suspension component is a pair of outstanding pegs attached to said dispenser in a spaced-apart manner, said second suspension component being a pair of slots in an upper portion of said bag, said pair of slots being spaced apart to register with said spaced-apart pegs, said bag being suspended by inserting said pegs through said slots.

17. The combination according to claim 12, wherein said first suspension component is a pair of outstanding pegs attached to said dispenser in a spaced-apart manner, said second suspension component being a pair of slots in an upper portion of said bag, said pair of slots being spaced apart to register with said spaced-apart pegs, said bag being suspended by inserting said pegs through said slots.

18. The combination according to claim 13, wherein said first suspension component is a pair of outstanding pegs attached to said dispenser in a spaced-apart manner, said second suspension component being a pair of slots in an upper portion of said bag, said pair of slots being spaced apart to register with said spaced-apart pegs, said bag being suspended by inserting said pegs through said slots.

19. The combination according to claim 14, wherein said first suspension component is a pair of outstanding pegs attached to said dispenser in a spaced-apart manner, said second suspension component being a pair of slots in an upper portion of said bag, said pair of slots being spaced apart to register with said spaced-apart pegs, said bag being suspended by inserting said pegs through said slots.

20. The combination according to claim 15, wherein said first suspension component is a pair of outstanding pegs attached to said dispenser in a space-apart manner, said second suspension component being a pair of slots in an upper portion of said bag, said pair of slots being spaced apart to register with said spaced-apart pegs, said bag being suspended by inserting said pegs through said slots.

21. The combination according to claim 2 further comprising a hopper provided above said dispenser head and in which said bag is suspended.

22. The combination according to claim 4 further comprising a hopper provided above said dispenser head and in which said bag is suspended.

23. The combination according to claim 6 further comprising a hopper provided above said dispenser head and in which said bag is suspended.

24. The combination according to claim 7 further comprising a hopper provided above said dispenser head and in which said bag is suspended.

* * * * *